April 7, 1970     M. K. NEWMAN ET AL     3,504,804
CENTRIFUGAL SEPARATOR
Original Filed Sept. 26, 1967     4 Sheets-Sheet 1
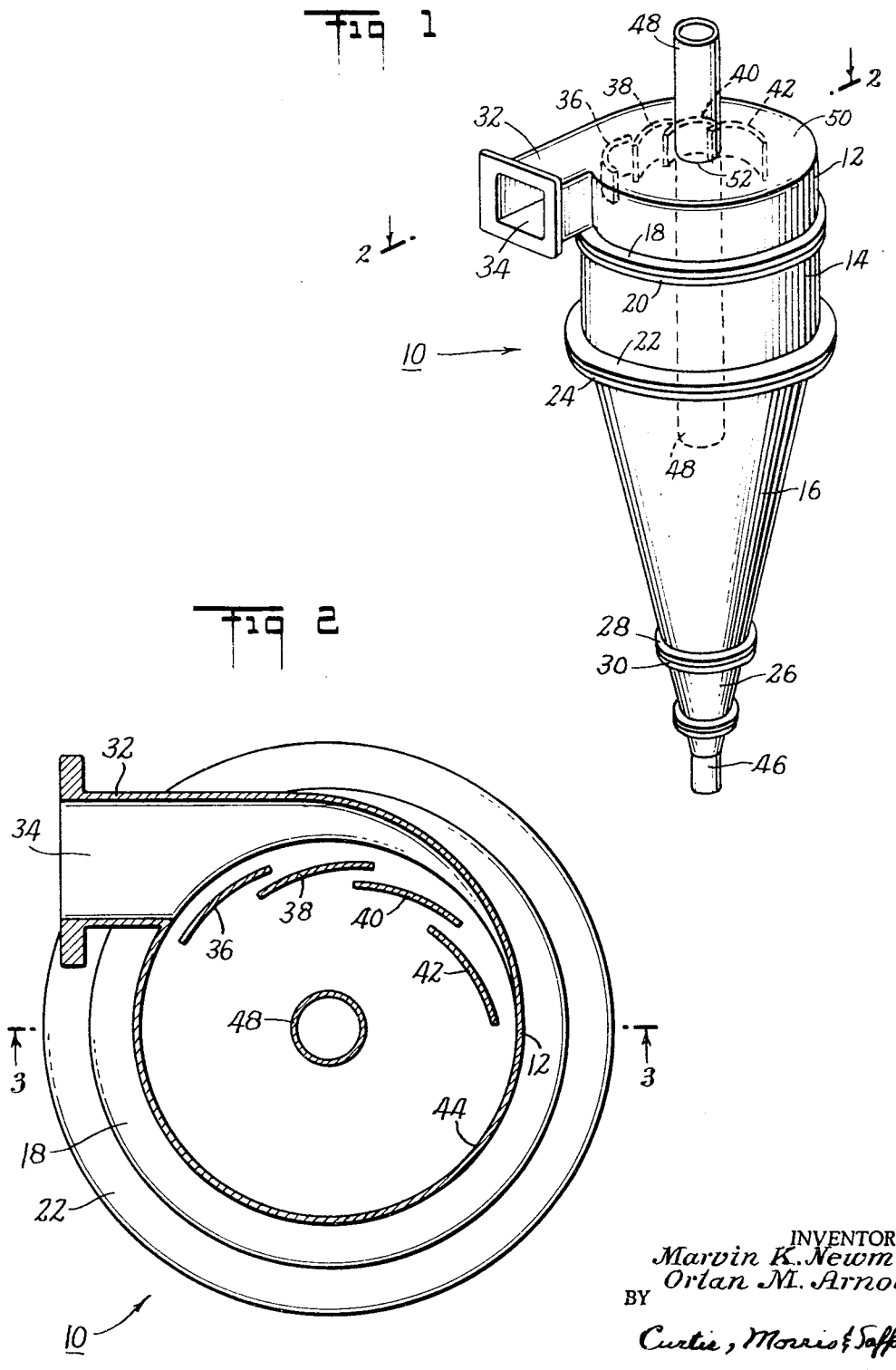
INVENTORS
Marvin K. Newman
Orlan M. Arnold
BY
Curtis, Morris & Safford
ATTORNEYS

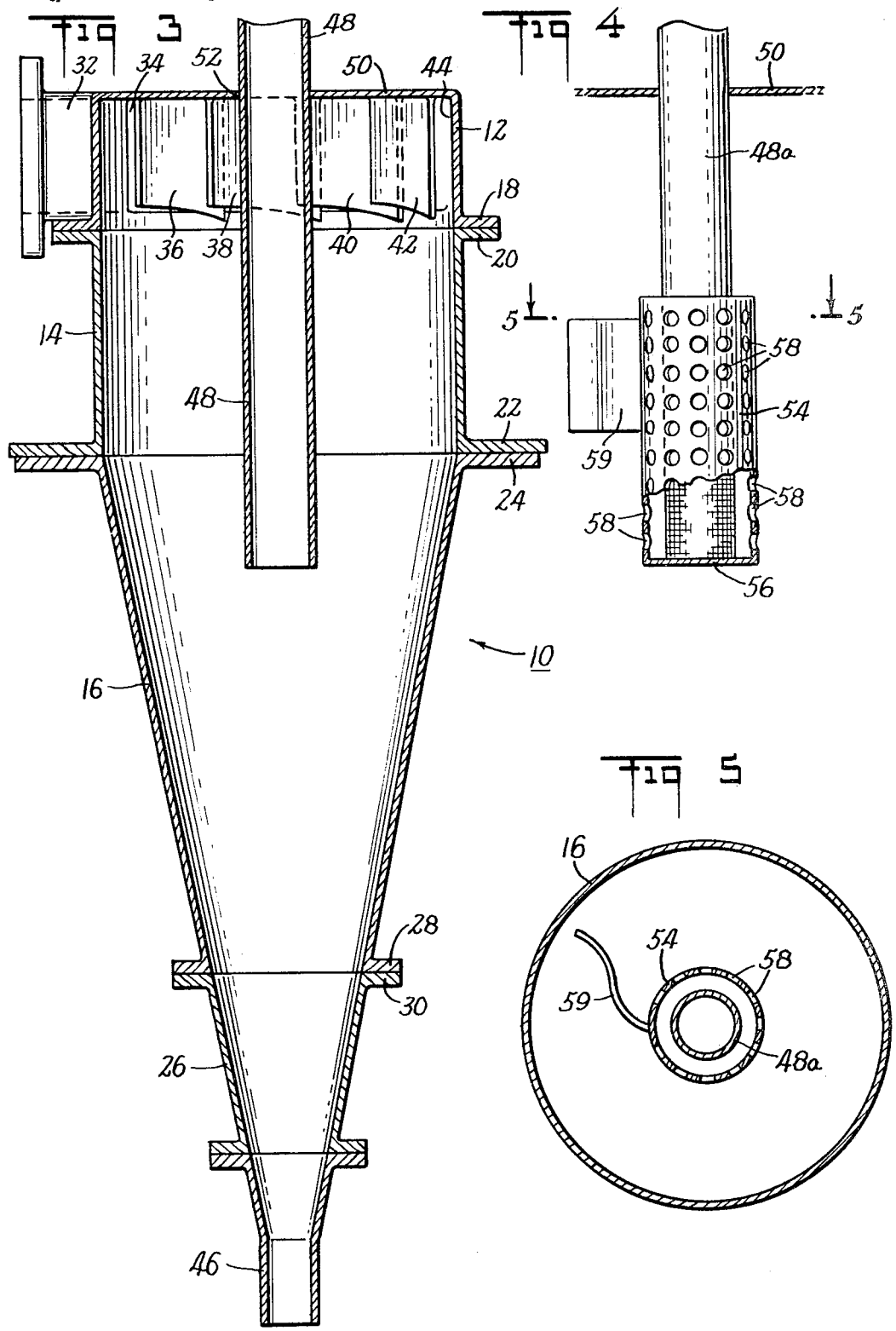

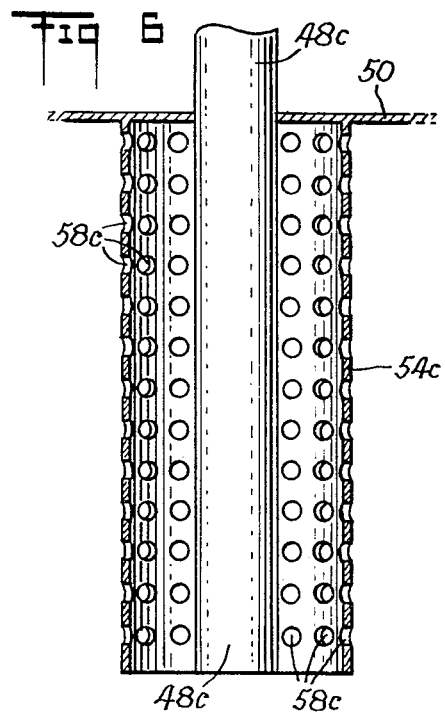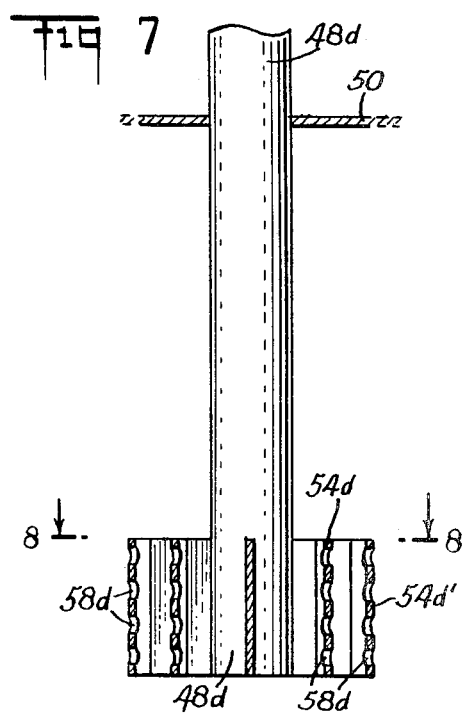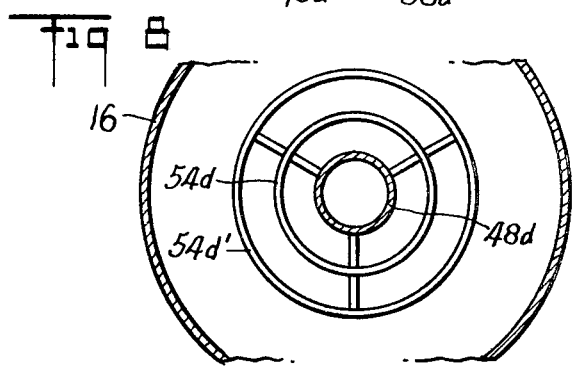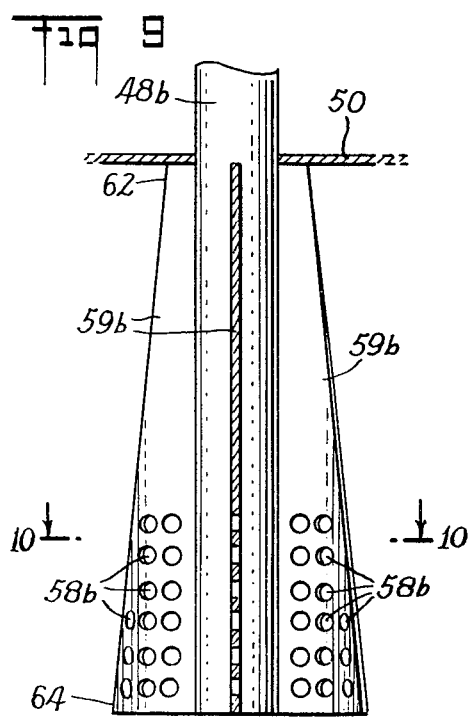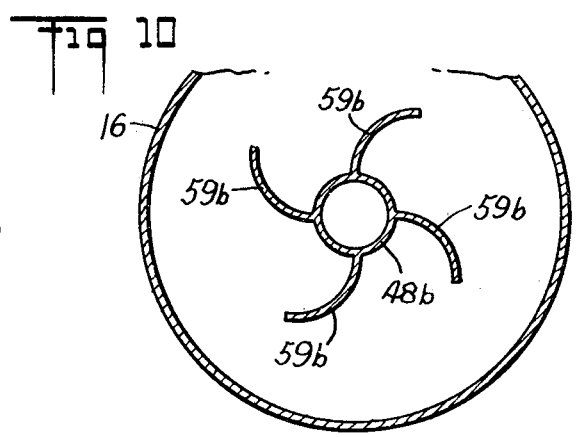

April 7, 1970  M. K. NEWMAN ETAL  3,504,804
CENTRIFUGAL SEPARATOR
Original Filed Sept. 26, 1967   4 Sheets-Sheet 4
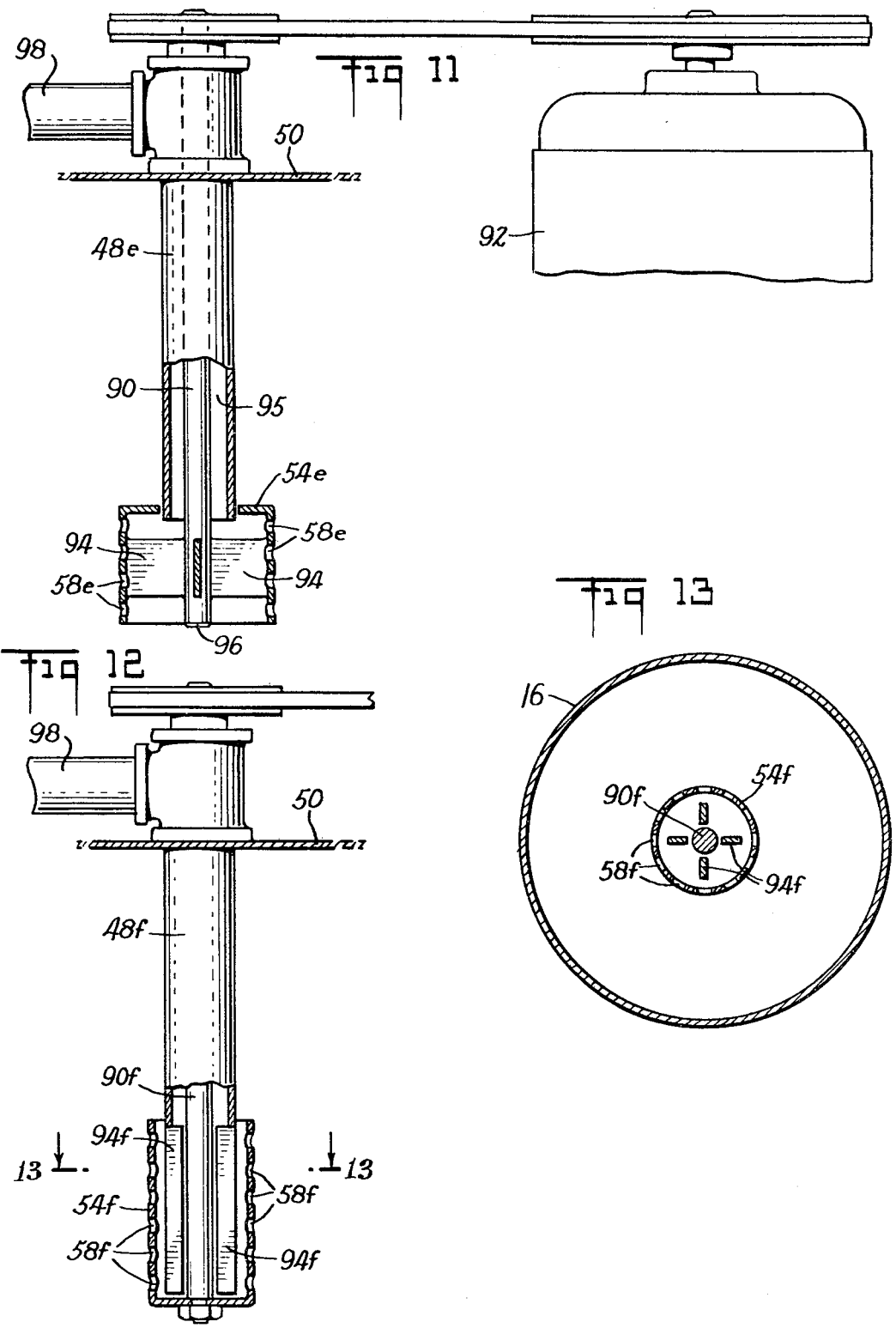

United States Patent Office 3,504,804
Patented Apr. 7, 1970

3,504,804
CENTRIFUGAL SEPARATOR
Marvin K. Newman, Southfield, and Orlan M. Arnold, Grosse Pointe Park, Mich., assignors to Ajem Laboratories, Inc., Livonia, Mich.
Original application Sept. 26, 1967, Ser. No. 670,727, now Patent No. 3,439,810, dated Apr. 22, 1969. Divided and this application July 23, 1968, Ser. No. 765,719
Int. Cl. B01d 21/26
U.S. Cl. 210—512
11 Claims

ABSTRACT OF THE DISCLOSURE

A centrifugal separator for classifying liquids containing suspensions of solid material wherein the centrifugal separator utilizes the high pressure tangential inlet flow of liquid and solid suspensions to create a vortexing action within a conically shaped separating chamber. The vortexing liquid is guided within the inlet scroll and in the conical separating chamber to induce liquid flow toward the walls of the separating chamber to thereby provide for a more efficient settling action on the suspended solid particles. Provision is also made to increase the separating effect just prior to the area of exit of the clarified liquid.

This application is a division of copending application Ser. No. 670,727, filed Sept. 26, 1967 and now U.S. Patent 3,439,810.

This invention relates to centrifugal separators and more particularly, to centrifugal separators relying on high pressure tangential inlet flow to create a vortexing action to separate finely divided solids suspended in a carrying fluid.

Centrifugal separators wherein clarified liquid is separated from a mixture composed of solid particles suspended in a liquid carrier have been designed with a liquid input that enters tangentially into a cylindrical chamber, usually under pressure. This arrangement has a tendency, due to the pressure and velocity of the incoming liquid, to cause the liquid to begin a rotational flow within the cylindrical chamber. Below the cylindrical inlet chamber there is usually associated a conical separating chamber with an outlet at the bottom to draw off the concentrated slurry. The rotational flow of the liquid within the chamber produces a centrifugal force on the suspended solid particles that throws them outward along the walls of the chamber. Thus, the liquid at the center of the chamber is relatively clear and free of suspended particles.

When this centrifugal action is solely dependent upon the pressure and resulting velocity of the incoming fluid, inefficiencies occur due to frictional effects that tend to slow down the vortexing action of the fluid within the separator and thus lessen the centrifugal force acting upon the suspended particles. This results in less particles being forced outwardly to the walls of the separator to there flow downward, by gravitational effects, along the conical walls of the separator housing and out the slurry exit.

It is therefore an object of the present invention to provide a centrifugal separator that takes greater advantage of the entering liquid velocity to provide for a more efficient removal of suspended particles from a liquid.

It is a further object of the present invention to provide a liquid separator wherein the centrifugal force acting on the suspended particles, tending to cause the suspended solid particles to be thrown outward, is augmented to thereby increase the migration of the suspended particles to the confining walls of the separator.

A still further object of the present invention is to provide a centrifugal separator wherein the efficiency of the unit can be kept constant even through the flow rate of the inlet fluid varies.

The apparatus of the invention adapted to achieve these objects comprises a cylindrical inlet housing having a liquid inlet tangentially disposed with respect to the inlet housing. The liquid containing suspended solid particles is allowed to enter the inlet housing under pressure greater than that in the housing and with high velocity. The cylindrical inlet housing is fixed to a conically shaped separator chamber; and, as the fluid, due to its high velocity, rotates within the inlet housing and chamber a vortexing action begins. The solid particles in this feed, due to centrifugal force, migrate outward in the vortexing liquid to the walls of the chamber and there, due to friction against the walls, the rotational velocity of the particles is slowed and then due to gravitational forces the particles flow downward along the walls of the inwardly sloping separator chamber to be removed from a lower slurry exit tube. Guide vanes, advantageously positioned within the inlet housing and also within the separator chamber, guide the vortexing liquid outward to the chamber walls thus increasing the tendency of the suspended particles to migrate toward the confining walls and thus to increase the separating effect.

In the specification and in the accompanying drawings there are described and shown illustrative embodiments of the invention and various modifications thereof are suggested, but it is to be understood that these are not intended to be exhaustive, but on the contrary are given for purposes of illustration in order that others skilled in the art may fully understand the invention so that they may modify and adapt it in various forms, each as may be best suited to the conditions of a particular use.

The various objects, aspects and advantages of the present invention will be more fully understood from a consideration of the following specification in conjunction with the accompanying drawings in which:

FIGURE 1 is a perspective view partly in phantom showing one embodiment of the present invention;

FIGURE 2 is a sectional view taken on line 2—2 of FIGURE 1 showing the position of the diverting blades in the inlet scroll area;

FIGURE 3 is a vertical section taken on line 3—3 of FIGURE 2 showing the position of the clarified liquid exit tube within the separator housing;

FIGURE 4 is an elevational view of an alternate embodiment of the clarified liquid exit tube;

FIGURE 5 is a sectional view taken along line 5—5 of FIGURE 4 showing the exit tube oriented within the centrifugal separator;

FIGURE 6 is an elevational view, partly in section, showing an alternate embodiment of the clarified liquid exit tube;

FIGURE 7 is an elevational view partly in section showing an alternate embodiment of the clarified liquid exit tube;

FIGURE 8 is a sectional view taken along line 8—8 of FIGURE 7 showing the orientation of the embodiment of FIGURE 7 in the centrifugal separator;

FIGURE 9 is an elevational view, partly in section, showing an alternate embodiment of the clarified liquid exit tube;

FIGURE 10 is a sectional view taken along lines 10—10 of FIGURE 9 and showing the orientation of the embodiment of FIGURE 9 within the centrifugal separator;

FIGURE 11 is an elevational view, partly in section showing an alternate embodiment of the clarified liquid exit tube;

FIGURE 12 is an elevational view, partly in section, showing still another alternate embodiment of the clarified liquid exit tube; and, FIGURE 13 is a sectional view taken along line 13—13 of FIGURE 12 showing the orientation of the embodiment of FIGURE 12 within the centrifugal separator.

Referring now to the drawing and more particularly to FIGURE 1, there is shown at 10 a centrifugal liquid separator having a generally cylindrical inlet scroll 12, a cylindrical separating chamber 14 and a lower conically shaped separating chamber 16. The inlet scroll 12 has a flange 18 on its lower portion that mates with a flange 20 on the upper portion of the cylindrical chamber 14. These are clamped together, e.g., by suitable attaching bolts (not shown). The flanges 22 and 24 on the lower portion of the cylindrical chamber 14 and upper portion of the conical chamber 16 similarly provide for clamped, or other suitable connections.

A lower extension 26 is also provided with connecting flanges 28 and 30. The assembly can thus be disassembled easily for maintenance and/or selective replacement of any of the various sections.

The inlet scroll 12 is provided with a tangential fluid inlet 32 through which the liquid carrying suspended solid particles is admitted, advantageously under pressure from a suitable pump (not shown). The cross-sectional shape of the inlet 32 may be circular; but in the preferred embodiment, the inlet cross-section is rectangular, as at 34. This rectangular cross-section aids in keeping the flow of the inlet fluid in as near linear flow condition as possible, to thus keep turbulence at the inlet to a minimum, affords better control of the liquid and increases the effective solid-liquid separation and thus increases the effectiveness of sedimenting the solid particles against the retaining interior walls of the separator.

Since the effectiveness of a centrifugal liquid-solid separator is dependent upon getting the fluid, and more especially the solid particles, against the interior walls of the separating chamber, the effectiveness of a centrifugal separator can be greatly increased with an increased ability of the liquid to reach the interior walls of the separating chamber as soon as possible. The pressure and velocity of the entering liquid and the tangentially oriented inlet 32 will cause the liquid to begin a vortexing rotation within the separating chamber and thus the suspended solid particles will, due to centrifugal force, migrate outward against the confining walls of the chamber. Diverting blades 36, 38, 40 and 42, respectively, are placed within the inlet scroll 12 to divert the liquid entering inlet tube 32 against the interior wall of the inlet scroll 12. As seen in FIGURE 2, the blades are arranged to divert and constrict the fluid entering from the inlet 32 against the interior wall 44 of the inlet scroll 12. Since the blades act to gradually constrict the cross-sectional area of the fluid flow, they provide a nozzle effect to increase the velocity of the incoming fluid and at the same time force the fluid close to the interior wall 44. This has a twofold effect that brings the liquid rapidly against the interior wall surface 44 and also increases the velocity of the incoming fluid. By the laws of fluid dynamics such a constriction increases velocity of flow and thereby increases the centrifugal force acting on the suspended particles and concurrently increases the tendency of these particles to migrate radially outward against the interior wall portion.

As the fluid continues its vortexing action it spirals downward and, when the fluid is in the conical chamber 16, the solid particles that have been forced outward against the wall by centrifugal force are slowed due to angular acceleration frictional effects and these particles gravitate downward along the inwardly sloping sides of the separating chamber 16. They thus tend to settle and concentrate in the lower portion 26 and are removed through the concentrated slurry outlet 46 at the bottom. The liquid moving toward the central axis of the separating chamber is thus relatively clear and free of suspended particles. It is removed through clarified liquid outlet tube 48 which extends axially through the inlet scroll. The clarified liquid is then piped away or emptied into a suitable collecting vessel (not shown).

The clarified liquid outlet tube 48 extends through an opening 52 in the top surface 50 of the inlet scroll housing; and the penetration depth of this tube within the separating chamber is adjustable to accommodate a number of variables. The nature and density of the solid particles suspended in the fluid and the pressure and velocity of the inlet liquid and in the scroll will determine the rate of sedimentation taking place in the separating chamber. Thus, where the particles are larger and heavier they will migrate outward due to centrifugal effects at a faster rate and the clarified liquid can be withdrawn from the separator chamber at a higher level than when the particles are smaller. Further, if the inlet pressure and velocity are lower the centrifugal effects are not as great and therefore the liquid will not be clarified until it reaches a lower depth within the separation chamber. Thus, the depth of the outlet 48 within the separating chamber will be adjusted to accommodate these variables in order to maintain a uniform clarity for the liquid exiting from outlet tube 48.

The liquid moving in the cylindrical section 14 and the upper end of the conical section 16 flows quite rapidly. Excess rapidity of movement of the liquid may tend to draw more solids into the clarified liquid outlet tube 48 than if a lower velocity of liquid were prevelant in the outlet tube area. Therefore, if liquid of high clarity is desired, one of the embodiments shown in FIGURES 4 to 13 may be preferred.

Referring now to FIGURE 4 for one alternative embodiment of the clarified liquid outlet 48a, there is shown a lower portion 54 having a closed lower section 56 and whose side wall has perforations 58 for passage of clarified liquid into the outlet tube 48a. With this embodiment, the perforated entrance to the clarified liquid outlet 48a reduces the migration velocity of the liquid in the outlet area. The reduction in the migration velocity across the outlet tube allows the solids that may still be suspended in the liquid as it approaches the outlet tube to settle downward rather than to be entrained by the liquid flow at the outlet tubing.

The perforations can be of various sizes, depending upon the type of solid particles to be encountered; and the tube 48a may even be made from a fine mesh screen.

Also shown with the embodiment of FIGURE 4 is stationary vane 59 attached to a mid portion of the clarified liquid exit tube 48a. The vane 59 has a generally convoluted shaped to aid in directing the vortexing liquid outward toward the wall of the separator housing and to keep the solid particles flow close to the separator wall, thereby to increased sedimenting along the inwardly inclined walls of the lower separating chamber 16. Any number of blades may be employed at various locations along the tube 48a to increase the tendency to push the liquid outward.

Referring now to FIGURE 9, there is shown an alternate embodiment of the clarified liquid outlet tube 48b. In this embodiment, a series of radiating curved fins 54b are provided to further reduce the velocity of the clarified liquid before it is drawn into the exit tube 48b. The fins 59b may vary in width from a narrow, as shown, at their tops 62 to a wider bottom, as at 64 and advantageously are curved in the direction of the vortexing. The fins as shown are perforated at 58b to allow a portion of the vortexing liquid to pass through the fins; larger solid particles remaining in the liquid may be restrained by these perforations. Due to the reduced velocity condition afforded by the radiating fins, the liquid in this area is relatively still and thus the trapped solid particles, since they are moving more slowly, tend to settle downward toward the slurry exit tube. The contour of the radiating fins 59b also provides an additional guide for vortexing the liquid against the sides of the separator chamber 16 to increase sedimenting action along the sloping walls of the chamber. The clarified liquid can then exit into the bottom of the exit tube 48b.

Referring now to FIGURE 6, there is shown another alternate embodiment 48c for the clarified liquid outlet tube. In this embodiment, tube 54c is a cylinder having perforations 58c in its wall and is concentrically disposed around the exit tube 48c. The perforations 58c in the cylinder act to reduce the flow rate of the clarified liquid near the clarified liquid outlet tube 48c and thus create a lower velocity near the outlet area. The perforations may also act as a screen for holding back larger particles and aid in the settling of these partciles.

Referring now to FIGURE 7, there is shown another embodiment of the outlet tube 48d, wherein a plurality of concentric cylinders 54d and 54d' are provided at the lower end of tube 48d. Each cylinder has perforations 58d, respectively, in its wall which together provide a labyrinth, or baffle, for the partially clarified liquid as it approaches the exit tube 48d. The multiplication of cylinders 54d and 54d' also reduces the flow rate of the liquid coming into the exit area and thus provides increased sedimentation.

In the embodiment shown in FIGURE 11, a drum 54e having in its side wall perforations 58e which can be of various sizes, or even a mesh screen, is mounted for rotational movement on shaft 90 concentrically disposed within outlet tube 48e. The upper end of shaft 90 is connected to a suitable drive such as a motor 92 so that the shaft 90 and drum 54e rotate within the separating chamber in the direction of the vortexing liquid. Internal vanes 94 extend from the lower end 96 of shaft 90 to support the drum 54e.

The drum 54e is rotated at a relatively low r.p.m. so as not to create too high a turbulence at the exit area but at a high enough r.p.m. to help throw out solids, if any remain in the liquid, in the area of the exit tube.

The vanes 94, as they rotate, aid in drawing the clarified liquid that has passed through the perforations 58e in toward the center of the exit tube 48c. The result is to further clarify the liquid just before it flows into the clarified liquid outlet tube 48e.

The drum 54e may also be rigidly affixed to tube 48e leaving only the vanes 94, attached to shaft 90, to rotate. In this embodiment, the perforated drum 54e acts as a baffle tending to slow down the exit velocity of the liquid as it approaches the outlet tube as in the embodiments of FIGURES 6 and 7, while the rotating vanes tend to accelerate the clarified liquid after it passes the baffle and entered the exit tube 54e, thereby to increase the rate of clarified liquid exit flow.

In both of the above-discussed alternatives, the clarified liquid escapes upward through the annular space 95 between the shaft 90 and the interior wall of the outlet tube 48e and is allowed to flow out laterally through tube 98.

In the embodiment shown in FIGURES 12 and 13, a rotating cylinder 54f, having perforations 58f in the cylindrical side (which may be a screen of varying mesh size) is affixed to concentric shaft 90f disposed within outlet tube 48f similar to the shaft 90 in the embodiment of FIGURE 11. The screen 54f is mounted on shaft 90f, e.g., by passing its end through the bottom end of the cylinder and threading a nut on it as shown.

Stationary internal guide vanes 59f are mounted to depend from the lower end of the clarified liquid outlet tube 48f. The rotating cylinder 54f provides a twofold effect of acting as a baffle and screen for the clarified liquid in the outlet tube area to thus provide a final filtration element and, also, as it rotates in the direction of the vortexing action it augments the centrifugal effect on particles remaining in the liquid in this area by helping to throw them outward against the confining wall 16 of the separating chamber.

Once the liquid has passed through the perforations 58f the stationary vanes assist in reducing the outlet suction pressure and prevent the body of liquid within the rotating cylinder from rotating therein so as to minimize unwanted turbulence; and also the vanes guide the liquid into the clarified outlet tube 48f. This embodiment is particularly advantageous for clearing from the inlet liquid minute suspended particles by the combined effects of centrifuging in the vortexing liquid and the rotating mesh screen.

While there have been described what are at present considered to be the preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. In a centrifugal separator for separating solid particles from a liquid comprising an inlet chamber including means for tangentially introducing a stream of solids-containing liquid under pressure to the upper portion of said inlet chamber, a generally frusto-conical separation chamber having its larger end in fluid communication with the lower portion of said inlet chamber, a clarified liquid exit conduit extending through said inlet chamber and into said separation chamber axially thereof for removing clarified liquid, an outlet conduit near the smaller end of said separation chamber for removing concentrated slurry containing separated solid particles and wherein separation of the solid particles from the liquid is effected by vortexing the solids-containing liquid in the inlet chamber and in said separation chamber to create a centrifugal force to cause said solid particles to migrate radially outward toward the confining wall of said separation chamber there to settle along its sloping wall and collect near the lower slurry outlet, thereby creating an area of relatively clarified liquid near the central axis of said separation chamber in the vicinity of the clarified liquid exit conduit, the improvement comprising:

means within said separation chamber to direct a portion of the vortexing liquid within said separation chamber outward toward the wall of said chamber to thereby increase the separation of solid particles along the inwardly sloping wall of said separation chamber.

2. The centrifugal separator of claim 1 wherein said means to direct said vortexing liquid includes at least one stationary vane extending from the exterior wall of said clarified liquid exit conduit, said vane being generally contoured in the direction of flow of the vortexing liquid and having its end spaced from the wall of said separation chamber to thereby constrict the flow of vortexing liquid and direct the portion of said liquid passing over said vane outward toward the wall of said separation chamber.

3. The centrifugal separator of claim 1 wherein said means to direct said vortexing liquid includes a plurality of fins radiating outward from the exterior wall of said clarified liquid exit conduit and curved in the direction of flow of said vortexing liquid, said fins varying in width from a narrow upper portion to a wider lower portion to thereby constrict the flow of vortexing liquid and direct the portion of said liquid passing over said fins outward toward the wall of said separation chamber.

4. The centrifugal separator of claim 1 wherein said means to direct said vortexing liquid includes a drum adapted to extend below the end of said clarified liquid exit conduit, said drum including means to impart rotational movement thereto in the direction of vortexing, whereby upon rotation of said drum the vortexing of the liquid around said drum is accelerated and concurrent increase in centrifugal force results from the accelerated vortexing.

5. In a centrifugal separator for separating solid particles from a liquid comprising a cylindrical inlet chamber including means for tangentially introducing a stream of solids-containing liquid under pressure to the upper portion of said inlet chamber, a generally frusto-conical separation chamber having its larger end in fluid communication with the lower portion of said inlet chamber, a clarified liquid exit conduit extending through said inlet chamber and into said separation chamber axially thereof for removing clarified liquid, an outlet conduit near the smaller end of said separation chamber for removing the concentrated slurry containing the separated solid particles and wherein separation of the solid particles from the liquid is effected by vortexing the solids-containing liquid in the inlet chamber and in said separation chamber to create a centrifugal force to cause said solid particles to migrate outward through the liquid toward the confining wall of said separation chamber there to settle along its sloping wall and collect near the lower slurry outlet thereby creating an area of relatively clarified liquid near the central axis of said separation chamber in the vicinity of the clarified liquid exit conduit, the improvement comprising:

means in said inlet chamber to increase the velocity of the entering solids-containing liquid and of the vortexing in said inlet chamber and said separation chamber, thereby increasing the centrifugal force acting on said solid particles to effect their migration outward to the wall of said separation chamber;

means within said separation chamber to direct a portion of the vortexing liquid toward the wall of said chamber thereby to increase the settling of said solid particles on the inwardly sloping wall of said separation chamber; and means within said separation chamber to reduce the velocity of the relatively clarified liquid in the area of said clarified liquid exit conduit and to filter said relatively quiescent liquid to thereby provide an additional settling effect on any solid particles remaining in the relatively clarified liquid.

6. In a centrifugal separator for separating solid particles from a liquid comprising an inlet chamber including means for tangentially introducing a stream of solids-containing liquid under pressure to the upper portion of said inlet chamber, a generally frusto-conical separation chamber having its larger end in fluid communication with the lower portion of said inlet chamber, a clarified liquid exit conduit extending through said inlet chamber and into said separation chamber axially thereof for removing clarified liquid, an outlet conduit near the smaller end of said separation chamber for removing concentrated slurry containing separated solid particles and wherein separation of the solid particles from the liquid is effected by vortexing the solids-containing liquid in the inlet chamber and in said separation chamber, the resulting centrifugal force driving said solid particles outward toward the confining wall of said separation chamber there to settle along its sloping wall and collect near the slurry outlet, thereby creating an area of relatively clarified liquid near the central axis of said separation chamber in the vicinity of the clarified liquid exit conduit, the improvement comprising:

means within said separation chamber to reduce the velocity of the relatively clarified liquid in the area of said clarified liquid exit conduit and to filter said relatively quiescent liquid to thereby provide an additional settling effect on any solid particles remaining in the relatively clarified liquid, said means to reduce the velocity and to filter the liquid in the area of said clarified liquid exit conduit includes a cylindrical drum mounted on the lower end of said clarified liquid exit conduit, said drum having a perforated side wall, a closed lower end and its upper end in fluid communication with the clarified liquid exit conduit, whereby the vortexing liquid as it passes through the perforated wall of said cylindrical drum is filtered and slowed, thereby reducing the velocity of said liquid and creating a relatively quiescent state within and immediately around said drum to thereby cause solid particles remaining in said liquid to settle to said slurry outlet.

7. In a centrifugal separator for separating solid particles from a liquid comprising an inlet chamber including means for tangentially introducing a stream of solids-containing liquid under pressure to the upper portion of said inlet chamber, a generally frusto-conical separation chamber having its larger end in fluid communication with the lower portion of said inlet chamber, a clarified liquid exit conduit extending through said inlet chamber and into said separation chamber axially thereof for removing clarified liquid, an outlet conduit near the smaller end of said separation chamber for removing concentrated slurry containing separated solid particles and wherein separation of the solid particles from the liquid is effected by vortexing the solids-containing liquid in the inlet chamber and in said separation chamber, the resulting centrifugal force driving said solid particles outward toward the confining wall of said separation chamber there to settle along its sloping wall and collect near the slurry outlet, thereby creating an area of relatively clarified liquid near the central axis of said separation chamber in the vicinity of the clarified liquid exit conduit, the improvement comprising:

means within said separation chamber to reduce the velocity of the relatively clarified liquid in the area of said clarified liquid exit conduit and to filter said relatively quiescent liquid to thereby provide an additional settling effect on any solid particles remaining in the relatively clarified liquid, said means to reduce the velocity and to filter the liquid in the area of said clarified liquid exit conduit includes at least a pair of concentrically disposed cylindrical baffles each having a perforated wall arranged around the lower end of said clarified liquid exit conduit whereby the vortexing liquid as it pases through said cylindrical baffles is filtered by the perforated walls and slowed, thereby reducing the velocity of said liquid and creating a relatively quiescent state immediately around said baffles and the inlet of said clarified liquid exit conduit to thereby cause any solid particles remaining in said liquid to settle to said slurry outlet.

8. In a centrifugal separator for separating solid particles from a liquid comprising an inlet chamber including means for tangentially introducing a stream of solids-containing liquid under pressure to the upper portion of said inlet chamber, a generally frusto-conical separation chamber having its larger end in fluid communication with the lower portion of said inlet chamber, a clarified liquid exit conduit extending through said inlet chamber and into said separation chamber axially thereof for removing clarified liquid, an outlet conduit near the smaller end of said separation chamber for removing concentrated slurry containing separated solid particles and wherein separation of the solid particles from the liquid is effected by vortexing the solids-containing liquid in the inlet chamber and in said separation chamber, the resulting centrifugal force driving said solid particles outward toward the confining wall of said separation chamber there to settle along its sloping wall and collect near the slurry outlet, thereby creating an area of relatively clarified liquid near the central axis of said separation chamber in the vicinity of the clarified liquid exit conduit, the improvement comprising:

means within said separation chamber to reduce the velocity of the relatively clarified liquid in the area of said clarified liquid exit conduit and to filter said relatively quiescent liquid to thereby provide an additional settling effect on any solid particles remaining in the relatively clarified liquid, said means to reduce the velocity and to filter the liquid in the area of said clarified liquid exit conduit includes a cylindrical drum rotatably mounted on the lower end of said clarified liquid exit conduit, said drum having perforations in its cylindrical wall to filter the vortexing liquid and reduce its velocity across the inlet of said clarified liquid exit conduit and wherein upon rotation of said drum in the direction of flow of the vortexing liquid, solid particles restrained by the perforations in the wall of said drum are thrown outward and then settle to said slurry outlet.

9. The apparatus of claim 8 wherein said drum is mounted on a shaft extending through said clarified liquid exit conduit and said shaft has means to impart rotation thereto and a plurality of radiating vanes extending from said shaft, said drum being carried by said vanes whereby rotation of said shaft rotates said vanes and said drum to thereby aid in flowing the clarified liquid into the clarified liquid exit conduit.

10. The apparatus of claim 8 wherein said drum is mounted on a shaft extending through said clarified liquid exit conduit and said shaft includes means to impart rotation thereto, and a plurality of stationary radiating vanes depending from the lower end of said clarified liquid exit conduit within said rotating drum, wherein said stationary vanes further reduce the velocity of said liquid near the clarified liquid exit conduit and guide the clarified liquid into said exit conduit.

11. In a centrifugal separator for separating solid particles from a liquid comprising an inlet chamber including means for tangentially introducing a stream of solids-containing liquid under pressure to the upper portion of said inlet chamber, a generally frusto-conical separation chamber having its larger end in fluid communication with the lower portion of said inlet chamber, a clarified liquid exit conduit extending through said inlet chamber and into said separation chamber axially thereof for removing clarified liquid, an outlet conduit near the smaller end of said separation chamber for removing concentrated slurry containing separated solid particles and wherein separation of the solid particles from the liquid is effected by vortexing the solids-containing liquid in the inlet chamber and in said separation chamber, the resulting centrifugal force driving said solid particles outward toward the confining wall of said separation chamber there to settle along its sloping wall and collect near the slurry outlet, thereby creating an area of relatively clarified liquid near the central axis of said separation chamber in the vicinity of the clarified liquid exit conduit, the improvement comprising:

means within said separation chamber to reduce the velocity of the relatively clarified liquid in the area of said clarified liquid exit conduit and to filter said relatively quiescent liquid to thereby provide an additional settling effect on any solid particles remaining in the relatively clarified liquid, said means to reduce the velocity and to filter the liquid in the area of said clarified liquid exit conduit includes a plurality of fins radiating outward from the exterior wall of said clarified liquid exit conduit and curved in the direction of flow of said vortexing liquid, said fins varying in width from a narrow upper portion to a wider lower portion, said fins being perforated, wherein said radiating fins constrict the flow of vortexing liquid and thereby reduce the velocity of said liquid in the area of said clarified liquid exit conduit and said perforations restrain solid particles remaining in said liquid but allow said restrained particles to migrate through the liquid toward said slurry outlet due to reduced velocity in the vicinity of said clarified liquid exit tube.

References Cited
UNITED STATES PATENTS 3,061,098  10/1962  Brezinski _____ 209—211

J. L. DECESARE, Primary Examiner

U.S. Cl. X.R.

209—211